US012450728B2

(12) United States Patent
Bertoni Scarton et al.

(10) Patent No.: US 12,450,728 B2
(45) Date of Patent: Oct. 21, 2025

(54) ASSET MAINTENANCE PREDICTION USING INFRARED AND REGULAR IMAGES

(71) Applicant: International Business Machines Corporation, Armonk, NY (US)

(72) Inventors: Tiago Bertoni Scarton, Sao Paulo (BR); Thiago Bianchi, São Carlos (BR); Eduardo Dias Felicio Junior, Sao Paulo (BR); Tarcisio Pereira, Sao Paulo (BR)

(73) Assignee: International Business Machines Corporation, Armonk, NY (US)

( * ) Notice: Subject to any disclaimer, the term of this patent is extended or adjusted under 35 U.S.C. 154(b) by 321 days.

(21) Appl. No.: 18/197,230

(22) Filed: May 15, 2023

(65) Prior Publication Data

US 2023/0281800 A1   Sep. 7, 2023

Related U.S. Application Data

(63) Continuation of application No. 17/332,975, filed on May 27, 2021, now Pat. No. 11,688,059.

(51) Int. Cl.
*G06T 7/00* (2017.01)
*G06F 18/22* (2023.01)
(Continued)

(52) U.S. Cl.
CPC ............. *G06T 7/001* (2013.01); *G06F 18/22* (2023.01); *G06T 5/50* (2013.01); *G06T 7/11* (2017.01);
(Continued)

(58) Field of Classification Search
CPC ... G06T 7/001; G06T 5/50; G06T 7/11; G06T 7/97; G06T 2207/10048;
(Continued)

(56) References Cited

U.S. PATENT DOCUMENTS 8,059,882 B2   11/2011   Amidi
8,150,105 B2    4/2012   Mian
(Continued)

FOREIGN PATENT DOCUMENTS

AU   2016102407 A4   5/2019
CN    105371957 A    3/2016
(Continued)

OTHER PUBLICATIONS

German Patent and Trademark Office, "Office Action," Sep. 25, 2024, 9 Pages, DE Application No. 112022001611.6.
(Continued)

*Primary Examiner* — Jennifer Mehmood
*Assistant Examiner* — Vaisali Rao Koppolu
(74) *Attorney, Agent, or Firm* — Scott Dobson (57) ABSTRACT

A method for predicting a time to a failure condition of an asset includes a first model, trained to reconstruct input image pairs to resemble a healthy condition asset. Similarity coefficients are generated for respective historical image pairs that include a visible-light and infrared light image by use of the reconstructed image pair by the first model as a similarity base and the respective historical image pairs include a timestamp of image capture. A second model is trained to predict a time to a failure condition of the asset based on similarity coefficients and timestamps of real-time image pair capture, timestamps of an asset failure condition, and similarity coefficients of the respective historical images. Responsive to receipt of a first real-time image pair, the method computes a predicted time to the failure condition of the asset.

20 Claims, 3 Drawing Sheets

(51) Int. Cl.
*G06T 5/50* (2006.01)
*G06T 7/11* (2017.01)

(52) U.S. Cl.
CPC ...... *G06T 7/97* (2017.01); *G06T 2207/10048* (2013.01); *G06T 2207/20076* (2013.01); *G06T 2207/20084* (2013.01)

(58) Field of Classification Search
CPC . G06T 2207/20076; G06T 2207/20084; G06T 7/0002; G06F 18/22; G06F 18/2413; G06V 10/774
See application file for complete search history.

(56) References Cited

U.S. PATENT DOCUMENTS

| | | | |
|---|---|---|---|
| 8,566,182 | B2 | 10/2013 | Brower |
| 2014/0358601 | A1 | 12/2014 | Smiley |
| 2016/0029826 | A1 | 2/2016 | Bongiovanni et al. |
| 2016/0217433 | A1 | 7/2016 | Walton |
| 2016/0283619 | A1 | 9/2016 | Yu |
| 2016/0295134 | A1 | 10/2016 | Beall |
| 2017/0078901 | A1 | 3/2017 | Iwanaga |
| 2017/0308834 | A1 | 10/2017 | Kim |
| 2019/0087256 | A1* | 3/2019 | Horrell ................ G07C 5/0825 |
| 2019/0146520 | A1 | 5/2019 | Naithani |
| 2020/0097720 | A1* | 3/2020 | Yang ...................... G06N 3/045 |
| 2020/0241490 | A1* | 7/2020 | Jermann .............. G05B 13/041 |
| 2021/0056678 | A1* | 2/2021 | Al Shehri ................ G06N 3/08 |
| 2022/0222799 | A1* | 7/2022 | Chen ...................... G06T 7/001 |
| 2022/0318980 | A1 | 10/2022 | Reznek |
| 2022/0383468 | A1 | 12/2022 | Bertoni Scarton et al. |

FOREIGN PATENT DOCUMENTS

| | | | | |
|---|---|---|---|---|
| CN | 112184661 | A | * 1/2021 | .......... G06F 18/251 |
| CN | 112733950 | A | 4/2021 | |
| CN | 117355869 | A | 1/2024 | |
| DE | 112022001611 | B4 | 4/2025 | |
| EP | 1501029 | A2 | 1/2005 | |
| EP | 1657610 | A2 | 7/2014 | |
| EP | 3579185 | A1 | 12/2019 | |
| GB | 2620703 | A | 1/2024 | |
| JP | 2005-017874 | A | 1/2005 | |
| JP | 2024-521631 | A | 6/2024 | |
| WO | 2020148625 | W | 7/2020 | |
| WO | 2022/247794 | A1 | 12/2022 | |

OTHER PUBLICATIONS

"Making predictive maintenance more predictable with thermal monitoring", Accelix, 10 pps., Predictive Maintenance, Feb. 8, 2018, <https://www.accelix.com/community/predictive-maintenance/making-predictive-maintenance-more-predictable-thermal-monitoring/>.

Guo et al., "Automated defect detection for sewer pipeline inspection and condition assessment", Science Direct, Automation in Construction, vol. 18, Issue 5, 2009, pp. 587-596, ISSN 0926-5805, <http://www.sciencedirect.com/science/article/pii/S0926580508001842>.

Huda et al., "Application of infrared thermography for predictive/preventive maintenance of thermal defect in electrical equipment", Applied Thermal Engineering 61 (2013) 220e227, 3 pps., <https://www.semanticscholar.org/paper/Application-of-infrared-thermography-for-of-thermal-Huda-Taib/ef506894cb12fe3534dc49b7fe2d55cb2c839b48>.

IBM: List of IBM Patents or Patent Applications Treated as Related. Filed Herewith. 2 pages.

International Application No. PCT/CN2022/094483 filed May 23, 2022.

International Search Report and Written Opinion dated Aug. 23, 2022 from International Application No. PCT/CN2022/094483 filed May 23, 2022.

Jaffery et al., "Design of early fault detection technique for electrical assets using infrared thermograms", International Journal of Electrical Power & Energy Systems, vol. 63, Dec. 2014, pp. 753-759, <https://www.semanticscholar.org/paper/Design-of-early-fault-detection-technique-for-using-Jaffery-Dubey/d8a249356757a1e5d05aa456cba6c583c6e9aa63>.

Ma et al., "Infrared and visible image fusion via gradient transfer and total variation minimization", Science Direct, Information Fusion, vol. 31, 2016, pp. 100-109, ISSN 1566-2535, <http://www.sciencedirect.com/science/article/pii/S156625351630001X>.

McLeod et al., "Autonomous inspection using an underwater 3D LiDARAutonomous inspection using an underwater 3D LiDAR", IEEE, Published in: 2013 Oceans—San Diego, Date of Conference: Sep. 23-27, 2013, 8 pps., <ieeexplore.ieee.org/abstract/document/6741175>.

Richter et al., "Safe visual navigation via deep learning and novelty detection", Massachusetts Institute of Technology Cambridge, MA, USA, 9 pps., 2017.

U.S. Appl. No. 17/332,975, filed May 27, 2021. This Reference is Not Attached Because It is Readily Available To the Examiner.

Guo et al., "Automatic Defect Detection and Recognition for Asset Condition Assessment: A Case Study on Sewer Pipeline Infrastructure System", Computing in Civil Engineering, 2007, 08 pages, https://ascelibrary.org/doi/abs/10.1061/40937%28261%2951.

Japan Patent Office, "Decision to Grant a Patent" Sep. 2, 2025, 05 Pages, JP Application No. 2023-567045.

* cited by examiner

ASSET MAINTENANCE PREDICTION USING INFRARED AND REGULAR IMAGES

FIELD OF THE INVENTION

The present invention relates to maintenance and failure prediction of assets, and more specifically, to the use of machine learning recognition of asset conditions based on visual and infrared images of assets to predict maintenance intervention.

BACKGROUND

Enterprise Asset Management (EAM) is a specific type of Enterprise Resource Planning (ERP), which includes the integrated management of main business processes, often in real-time and mediated by software and technology. EAM can be characterized as having functionalities supporting management activities of large-scale assets, such as fleets of trucks, construction equipment, turbines, oil platforms, and energy generating facilities. EAM systems and software facilitate the design, construction, operation, maintenance, and replacement of large-scale assets and asset components.

Asset failure prevention approaches include management by the use of data tracking mean-time-between-failure (MTBF) of asset components. Businesses and organizations benefit from accurately determining MTBF and taking action performing maintenance activities to prevent failures while avoiding maintenance performance before needed.

Infrared (IR) light is a type of radiant electromagnetic energy that is invisible to human vision but can be felt or measured as heat. Capturing IR images with special devices, such as thermal imagery cameras, adds additional details of anomalies that otherwise would not be detected by visible light images or human vision. Often, IR images provide what is referred to as a thermal signature that provides information regarding normal or expected operational conditions.

SUMMARY

Embodiments of the present invention disclose a computer-implemented method, computer program product, and system for predicting a time to a failure condition of an asset. The computer-implemented method provides for one or more processors to train a first model to reconstruct an image pair of an asset to a healthy condition status image pair of the asset. The one or more processors generate a similarity coefficient between a historical image pair and a reconstruction of the historical image pair by the first model, for the plurality of historical image pairs, respectively, in which the historical image pair includes a timestamp capture of the historical image pair. The one or more processors train a second model to predict a duration until a failure condition of the asset occurs, based on a correlation between the similarity coefficients and the timestamps of the capture of the respective historical image pairs and a real-time image pair of the asset and a corresponding timestamp of the capture of the real-time image pair. In response to receiving a first real-time image pair of the asset and a timestamp of the capture of the first real-time image pair, the one or more processors generate similarity coefficients between the first real-time image pair and the reconstructed real-time image pair by the first model, and the one or more processors compute a predicted time to a failure condition status of the asset, based on the similarity coefficients and the timestamp of the capture of the first real-time image pair, a historical image pair and timestamp with corresponding similarity coefficients, and a timestamp of the failure condition of the asset.

DETAILED DESCRIPTION

Embodiments of the present invention recognize that accurately determining when to perform preventative maintenance on high-value assets can avoid costly or disastrous consequences from asset failure and prevent higher operational costs by not replacing components or performing maintenance activity more frequently than needed. Often, the occurrence of asset failure can have significant consequences, which encourages a higher frequency of maintenance activity. Embodiments of the present invention recognize that asset owners often opt for a "lesser-of-two-evils" philosophy of practice and accept the inconvenience and additional costs associated with the higher scheduled frequency of asset maintenance.

Embodiments of the present invention also recognize that asset inspections often require manual activity to determine indicators of whether the asset requires maintenance, which includes operational and human risks, or may present challenges to accurate inspection results due to restricted access to assets or asset components. Embodiments further recognize that asset owners balance decisions of performing more frequent asset inspections that include a higher cost and potential risk to inspectors and risking greater consequences of asset failure.

Embodiments of the present invention provide a computer-implemented method, computer program product, and computer system for predicting a failure condition associated with an asset, based on generating similarity coefficients from regular visible light images and infrared images that provide a quantified difference of a current asset's condition from the asset's healthy condition. Embodiments also provide a machine learning model to predict when a given asset is likely to fail or need a maintenance-related intervention action by correlating the coefficients of similarity between the regular image and infrared image of a current inspection with corresponding similarity coefficients of an image pair from the plurality of historical regular and infrared image pairs associated with prior failure conditions of the asset and prior inspections of the asset condition.

In an embodiment of the present invention, the term "image(s)" refers to a digitized representation of objects rendered as a mosaic of pixels and in formats enabling computer-based analysis. Embodiments include regular images, which are images that capture electromagnetic wavelengths associated with visible light, and infrared images, which capture electromagnetic wavelengths beyond (i.e., above) that of visible red light.

In some embodiments, the capture of the regular images and infrared images occurs at approximately the same time and includes computer-recognizable features associated with groupings of pixels within the respective image. In some embodiments, the terms "coefficients of similarity" or "similarity coefficient(s)" refer to determining a value, often referred to as a distance, between corresponding regions of a pair of current light-source images (i.e., current visual light-source image and previous light-source image as a pair), and more particularly, to a magnitude value given to a vector in multi-dimensional space representing the distances between one or more features located within respective regions of the pair of images. A greater distance indicates less similarity between features of the image pair, while a lesser distance value indicates a greater similarity between the features of the image pair. For example, a computer image analysis identifies a set of features in each of two infrared images of a component of an asset. A region of pixels within the respective regions of the infrared images contains the identified features and the analysis includes the generation of a similarity coefficient between the respective regions of the infrared images as well as attributes of the pixel regions that can be assigned as different dimensions of the vector representation.

In some embodiments of the present invention, an asset refers to a physical object that can be inspected by image capture and performs operations that will result, in time, in a failure of the asset to perform an expected service. In some embodiments, an asset includes large-scale items, such as vehicles, construction equipment, turbines, generators, aircraft components, and the like; however, embodiments of the present invention are not limited by the size, type, or role of an asset. In some embodiments, a primary asset may include subcomponents that may also be considered a secondary asset of the primary asset. Embodiments of the present invention consider actions to prevent or avoid a failure of the operational performance of the asset as an intervention of the asset to perform a preventative activity, such as maintenance. In some embodiments, a reference to a failure condition of an asset includes a degraded performance condition of the asset. In some embodiments, an inspection of an asset is performed prior to, and subsequent to an intervention of the asset and includes capturing regular images and infrared images of the asset. For purposes of clarity and simplicity, references made, herein, to an asset failure, asset failure event, or a failure condition of an asset include asset conditions of near-failure or imminent failure supporting a preventative objective.

Embodiments provide a practical solution to the problem of determining an accurate prediction of when to perform an intervention on an asset for maintenance or other preventative action prior to asset failure. Embodiments receive a sampling of image pairs of an asset in which the image pairs reflect a healthy condition status of the asset and receive a plurality of historical image pairs of the asset that include a failure condition of the asset and asset inspections. In some embodiments, the historical image pairs of a set of similar or identical assets or asset components (along with respective timestamp information) can be combined in a historical collection of image pairs of the asset type. For example, image pairs of brake assembly of a fleet of similar trucks may be combined to create a larger set of historical image pairs. The historical image pairs of the asset include a timestamp of the image capture and information associated with the particular intervention activity. In some embodiments, a response to a failure condition of the asset involves an intervention activity to repair, service, or replace the asset. In other embodiments, the intervention provides an inspection of the asset and includes a timestamp of the inspection along with a capture of an image pair of the asset.

For example, an enterprise organization may associate interventions of the asset with a work order or other formal documented information, such as hiring or scheduling the intervention activity. The work order may contain documentation of the intervention activity as well as the timestamp of the activity, and if the intervention involves asset repair or replacement, then the work order information includes the type of failure, the duration of repair or maintenance, parts replaced, adjustments made, and costs associated with the intervention. Embodiments of the present invention include intervention activity information along with the inspection, maintenance activity, and failure event repairs within the plurality of historical image pairs. Timestamp information associated with historical images of inspections and asset failure events serves as data indicating the duration of time to a subsequent asset failure event. Timestamp information associated with the image pairs captured during intervention provide data for machine learning prediction of a time to asset failure.

Embodiments perform a segmentation of the regular image and infrared image of the image pair to provide a more granular representation of components of the asset. In some embodiments, the segmentation of an image generates a set of regions of pixels that form a square matrix of regions (e.g., n*2 regions).

Embodiments train a first model to receive image regions of the asset as input and perform a reconstruction of the input to a healthy condition image of the asset. The training of the first model includes exclusively providing image pairs of a healthy condition asset from the sampling of image pairs of the asset as input for training data. In this manner, the first model establishes a reference condition of a healthy condition of the asset given various image input from real-time inspections. The real-time inspection image pairs may be captured under varying conditions that may differ from the original sampling of image pairs of a healthy condition asset. The use of the original sampling of image pairs as a healthy condition reference of real-time image pairs can inaccurately affect similarity coefficient results in otherwise non-contributing regions of the image pair. For example, the angle, lighting, or non-impacting accumulated debris may result in inaccurate similarity coefficient computation.

In various embodiments, the training of the first model includes identifying and recognizing features of the asset within respective region segments of the received sampling of image pairs. In some embodiments, the healthy condition status of the asset includes a new asset, a replaced component of the asset, and an adjusted asset or component of the asset, that places the asset in an operational condition with an absence or reduction of wear, stress, fatigue, vibration, excess heat, or other attributes that would indicate an operational condition away from a new or near-new condition and towards a failure condition of the asset. Training the model to identify the features within regions of the sampling of image pairs of the asset that have a healthy condition status provides a reference point for generating similarity coefficients between historical images and the reference images. To generate reference images, the first model reconstructs a copy of the regular and infrared real-time images, received as inputs, to the healthy condition of the asset (i.e., reconstructs to as near 'healthy condition' as possible), which serves as a reference of changes to the asset and provides improved accuracy of the computed similarity coefficients. The reconstruction of the real-time images avoids issues associated with non-contributing components of the images affecting analysis and determination of similarity coefficients.

Embodiments of the present invention generate a similarity coefficient between a reference image pair depicting a healthy condition of the asset, and a respective image pair from the plurality of historical image pairs of the asset. Embodiments generate a similarity coefficient for each segmented region of each image pair of the plurality of historical image pairs. In various embodiments, providing the respective historical image pair to the first model enables the reconstruction of the historical image pair. The reconstruction forms a reference image pair, which includes regions of a healthy condition asset. Embodiments generate a similarity coefficient between the segmented regions of the reconstructed regular and infrared images of the historical image pair and the segmented regions of the respective regular and infrared images of the historical image pair. In some embodiments, a similarity coefficient is generated for the respective image pairs for the plurality of historical image pairs.

Embodiments perform the generation of similarity coefficients for each historical image pair of the plurality of historical image pairs of the asset. The plurality of historical image pairs represents inspections and instances of an asset failure event captured from prior intervention activities of repair, maintenance, and inspection of the asset and includes a timestamp and additional information associated with the intervention activity. The resulting set of similarity coefficients of the plurality of historical image pairs provides a range of similarity values associated with the asset from a healthy condition status to a failure status. In some embodiments, the similarity coefficients are computed as a Euclidean distance between pixels in a region of a reference image of the asset and the corresponding pixels of the region in the real-time image of an image pair of an inspection of the asset. In other embodiments, the similarity coefficients are computed based on cosine similarity methods, or other similarity methods.

Embodiments of the present invention train a second model to predict a time to a failure condition of the asset. The predicted time to a failure condition enables planning and performance of a maintenance intervention on the asset to prevent a failure condition. The determination of the predicted time to failure involves correlating the similarity coefficients of a real-time image pair from an asset inspection to corresponding similarity coefficients from image pairs of the plurality of historical image pairs. Additionally, the duration of time between the timestamp associated with the corresponding historical image pairs and a subsequent historical asset failure condition timestamp is a contributing factor in the determination of the predicted time to failure of the asset. In some embodiments, adjustments of the predicted time for intervention to a timeframe prior to the predicted failure condition of the asset prevent a failure occurrence. In some embodiments, information associated with the plurality of historical image pairs provides the data to train the second model for the prediction of a failure condition of the asset. The historical image pair information includes a timestamp of the historical intervention, the regular and infrared image pair captured during the historical intervention, and details of the intervention, such as details of the failure condition, maintenance/repairs performed, time to perform the intervention, and cost of the intervention.

Embodiments of the present invention generate real-time similarity coefficients for respective regions of an infrared image and a regular image, in response to receiving a real-time image pair of the asset. In some embodiments, the performance of a real-time inspection of the asset in which an image pair is captured includes a timestamp associated with the image pair. Embodiments of the present invention generate similarity coefficients from the real-time image pair of the inspection by submitting a copy of the infrared and regular images as input to the first model, which outputs a reconstruction of the submitted images towards an image depicting a healthy condition asset as a reference. The real-time image pair of the inspection and the reconstructed image pair references provide the basis for generating similarity coefficients for the real-time inspection. Embodiments generate similarity coefficients for the respective segmented regions of the corresponding infrared images and the respective segmented regions of the corresponding regular images.

Embodiments of the present invention compute a predicted time to a failure event of the asset, based on a correlation between (i) the similarity coefficients of the regions of the real-time image pair and timestamp of the capture of the real-time image pair, and (ii) the regions of a historical image pair of the plurality of historical image pairs with corresponding similarity coefficients, and a time delta determined from the timestamp of the capture of the real-time image pair and the timestamp of the capture of an image pair of a failure condition of the asset subsequent to the historical image pair with the corresponding similarity coefficients.

In some embodiments, work orders or other documented asset intervention information sources include the pair of images (i.e., infrared image and regular visible light image) of the asset condition, and a timestamp of image capture, and may include one or a combination of the duration of the intervention, the activities performed during the intervention, whether the intervention was in response to a failure condition of the asset, and the cost of the intervention. In some embodiments, the work orders associated, respectively, with the plurality of historical images of the asset include interventions of asset inspection subsequent to a healthy condition status of the asset and prior to a failure condition of the asset.

In some embodiments, the first model includes an autoencoder neural network and training that uses regular images and infrared images of an asset with a healthy condition status. In some embodiments, a separately developed and trained version of the first model performs reconstruction of infrared images, and similarly, a different version of the first model developed and trained using regular images, performs reconstruction of regular images of the asset, respectively, to a corresponding infrared or regular image depicting similarity (i.e., very low similarity distance values for similarity coefficients) to a healthy condition status of the asset. In some embodiments, development, and training of the second model includes separate versions using regular image similarity coefficients and infrared image similarity coefficients, respectively, from real-time inspections of the asset. Embodiments of the present invention recognize that the second model performs a regression function to learn the patterns of the delta of time to a failure condition of the asset from inspection images and timestamps associated with the capture of the inspection images, and similarity coefficients of historical failure condition image representations, historical inspection image representations, and the timestamps associated with the intervention.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
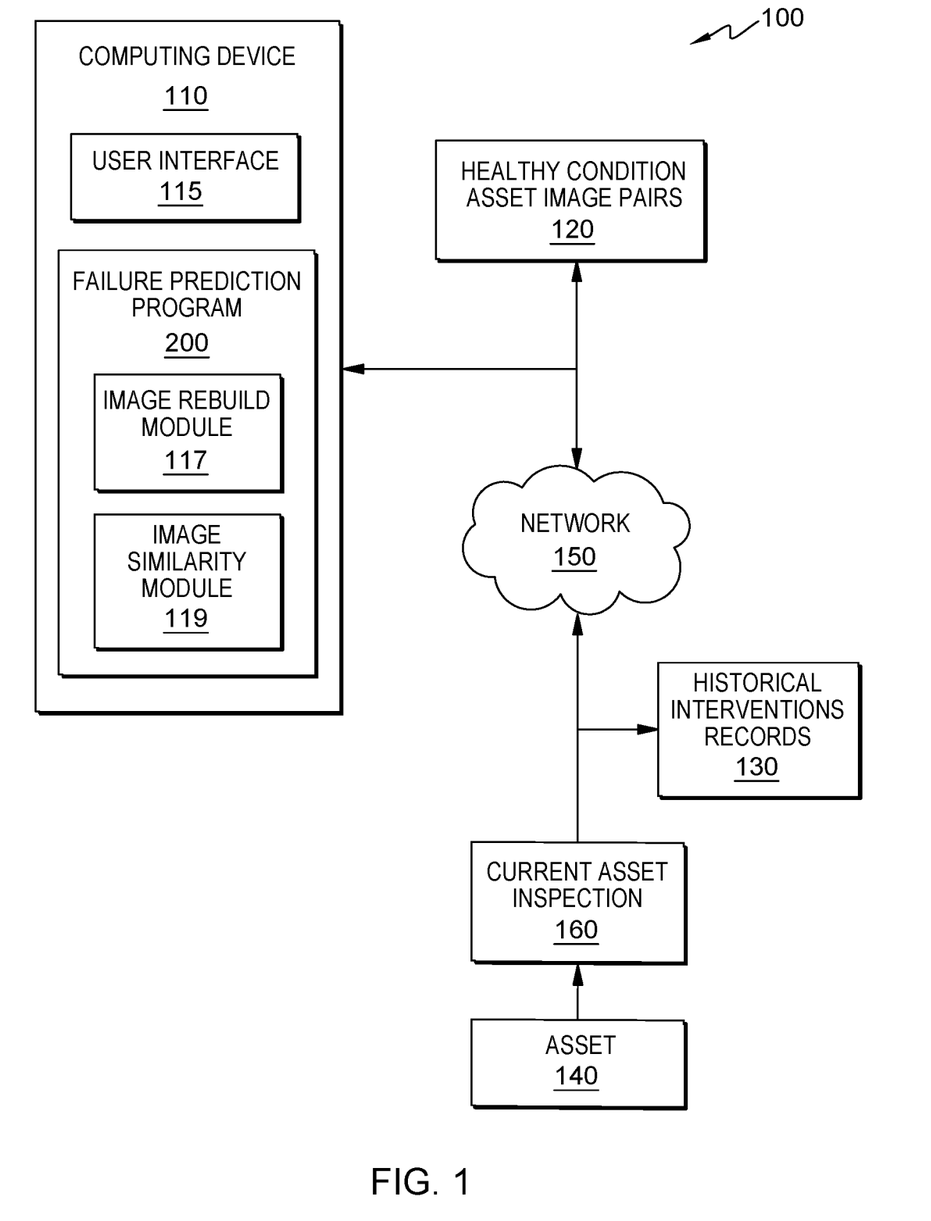
FIG. 1 is a functional block diagram illustrating a distributed computer processing environment, in accordance with an embodiment of the present invention.

The present invention will now be described in detail with reference to the Figures. FIG. 1 presents a functional block diagram illustrating a distributed computer processing environment, generally designated 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed computer processing environment 100 includes computing device 110, healthy condition asset image pairs 120, historical intervention records 130, and current asset inspection 140, all interconnected via network 150. Distributed computer processing environment further includes asset 160 from which current asset inspection 160 is obtained.

Computing device 110 includes user interface 115, and failure prediction program 200, which is further depicted as including the functionality of image rebuild module 117 and image similarity module 119. In some embodiments, computing device 110 can be a blade server, a web server, a laptop computer, a desktop computer, a standalone mobile computing device, a smartphone, a tablet computer, or another electronic device or computing system capable of receiving, sending, and processing data. In other embodiments, computing device 110 may be a computing device interacting with applications and services hosted and operating in a cloud computing environment. In another embodiment, the computing device 110 can be a netbook computer, a personal digital assistant (PDA), or other programmable electronic devices capable of receiving data from and communicating with other devices (shown and not shown) in distributed computer processing environment 100, via network 150, as well as performing operations of failure prediction program 200. Alternatively, in some embodiments, computing device 110 may be communicatively connected to failure prediction program 200, operating remotely. Computing device 110 may include internal and external hardware components, depicted in more detail in FIG. 3.

User interface 115 provides an interface to access the features and functions of computing device 110. In some embodiments of the present invention, user interface 115 provides access to operate and select options for risk fencing program 200 and may also support initiating supporting training of a machine learning model component of failure prediction program 200. User interface 115 may also provide access and operation controls of other applications, features, and functions of computing device 110 (not shown). In some embodiments, user interface 115 provides display output and input functions for computing device 110. In other embodiments, user interface 115 provides display output and enables the selection of options and functions associated with failure prediction program 200 operating on computing device 110.

User interface 115 supports access to alerts, notifications, and provides access to forms of communications. In one embodiment, user interface 115 may be a graphical user interface (GUI) or web user interface (WUI) and can receive user input and display text, documents, web browser windows, user options, application interfaces, and instructions for operation, and include the information (such as graphic, text, and sound) that a program presents to a user and the control sequences the user employs to control the program. In another embodiment, user interface 115 may also include mobile application software that provides respective interfaces to features and functions of computing device 110. User interface 115 enables respective users of computing device 110 to receive, view, hear, and respond to input, access applications, display content of online conversational exchanges, and perform available functions.

Failure prediction program 200 includes image rebuild module 117 and image similarity module 119. Failure prediction program 200 predicts the duration of time from an inspection of an asset that includes the capture of an image pair of the asset or components of the asset to a failure condition of the asset. Failure prediction program 200 determines the time to the asset's failure condition by correlating similarity coefficients of segmented regions of the captured image pair of the asset from an inspection to similarity coefficients of a plurality of historical image pairs of the asset captured over time that include historical image pairs of inspections and image pairs of the failure condition of the asset.

Failure prediction program 200 segments each image of an image pair into "n×n" regions of pixels to obtain a more granular representation of the asset and the asset's components. The image pairs include a regular image from light visible to human sight, and an infrared image of light not visible to human sight but indicating heat levels of the asset and asset components. Failure prediction program 200 determines similarity coefficients by applying similarity functions to the segmented regions of each of the image pair and to corresponding images of the image pair that depict the asset in a healthy condition status. Failure prediction program 200 includes image rebuild module 117 in which a model is trained to receive image pair input from historical or real-time inspections and rebuild or reconstruct the received input to a condition that reflects the asset having a healthy condition status. Failure prediction program 200 determines the similarity coefficients between the segmented regions of the received image pair and the reconstructed image pair and performs the determination of similarity coefficients, respectively, for the plurality of historical image pairs as well as real-time inspections.

Failure prediction program 200 includes a second model that computes the time to the failure condition of the asset from a real-time inspection in which the receipt of an image pair includes a timestamp of the capture of the image pair. The plurality of historical image pairs, comprised of an infrared image and a regular image, and the timestamp and information associated with each of the historical image pairs provide the training data for the second model. Training of the second model enables learning of the correlations of inspection timing and conditions and the similarity coefficients associated with the image pair regions of the inspection, to the plurality of historical image pairs and associated timing and conditions.

Image rebuild module 117 receives healthy condition asset image pairs 120 as training data to perform a rebuild or reconstruction of received images resulting in image data that depicts or nearly depicts the asset as having a healthy condition status. In some embodiments, image rebuild module 117 includes an autoencoder convolutional neural network model that receives training by the input of selected images that represent asset 140 in a healthy condition status. In some embodiments, the training of image rebuild module 117 enables the performance of image reconstruction on both regular images and infrared images. In other embodiments, image rebuild module 117 includes a separate trained neural network for regular images and a separate trained neural network for infrared images. Image rebuild module 117, when properly trained, receives image pairs of the plurality of historical image pairs of asset 160 from historical intervention records 130 and reconstructs the respective image pairs (or a copy of the respective historical image pair) to generate regular and infrared reference images of the respective historical image pairs. Generating similarity coefficients of respective historical image pairs involves comparing similarity distances between features of image segments of the reconstructed reference images and the historical image pair reflecting the condition of asset 140. Image rebuild module 117 receives current asset inspection 160 images to generate a similarity coefficient baseline for similarity coefficient determination of ongoing inspections and to enable prediction of time to a failure condition of the asset, performed by failure prediction program 200.

Image similarity module 119 computes similarity coefficients between segmented regions of one image of an image pair and the corresponding segmented regions of the same image type of another image pair. In some embodiments, the similarity coefficients correspond to a Euclidian distance computed from the pixels of one region of a first image and the corresponding region of a second image. For example, segmentation of a first infrared image of a historical image pair results in each image of the image pair divided into sixteen regions, and input of a digital copy of the first infrared image regions to image rebuild module 117, which performs as a first model of failure prediction program 200. Image rebuild module 117 reconstructs the input image regions to approximately depict a healthy condition status of the asset. Image similarity module 119 determines the Euclidian distances between pixels of the corresponding regions for the first infrared image of the historical image pair and the reconstructed image regions depicting a healthy condition asset. A greater computed distance between regions reflects less similarity and more likely that the asset is in a less-healthy condition.

Healthy condition asset image pairs 120 provide a source of selected infrared and regular images of the asset that include a condition that is absent indications of degradation, wear, consumption, damage, or other distinguishing characteristics from images of a near-new operational asset. Image rebuild module 117 receives image pairs from healthy condition asset image pairs 120 as training data that enables image rebuild module 117 to reconstruct received images into infrared and regular images of the asset having a healthy condition status.

Historical intervention records 130 contains a collection of inspection, maintenance, repair, and replacement activities performed on asset 140. In some embodiments, historical intervention records 130 include image pairs, a timestamp of when images are taken, also referred to as when images are captured, and data associated with the intervention. In some embodiments, the interventions are associated with a work order or other document recorded in a digital format that includes the digitized infrared image, the regular image of the asset as well as the activities of the intervention, the duration of the intervention, and the cost associated with the intervention. In some embodiments, a failed condition of the asset results in an intervention of repair, replacement, maintenance, or other corrective action. In other embodiments, an inspection of the asset subsequent to a repair intervention and prior to a failure condition of the asset produces intermediate image pair and timestamp information.

Current asset inspection 140 represents a real-time intervention activity that includes the creation of an image pair containing an infrared image and a regular image of the asset, and a timestamp of the image pair capture and other condition information associated with the inspection is included in a record of the current asset inspection. In some embodiments, failure prediction program 200 processes the image pair created by current asset inspection 140 to predict a time to a failure condition of the asset from the timeframe of the timestamp of the current inspection image pair. In some embodiments, a remotely guided drone performs the real-time asset inspection of current asset inspection 140, which avoids human exposure to risk conditions. In other embodiments, one or a set of cameras positioned to capture an infrared image and a regular image of the asset at designated intervals provides the real-time inspection image pair of current asset inspection 140.

Asset 160 performs an operational function on which positive results depend. In embodiments of the present invention, the operation of asset 160 produces a degradation or consumption of asset 160 that requires an intervention for the continuation of asset 160's operation. In example embodiments, asset 160 can be but is not limited to, a motor, a turbine, a vehicle component, a power generation system, or components of package handling equipment.

Figure 2:
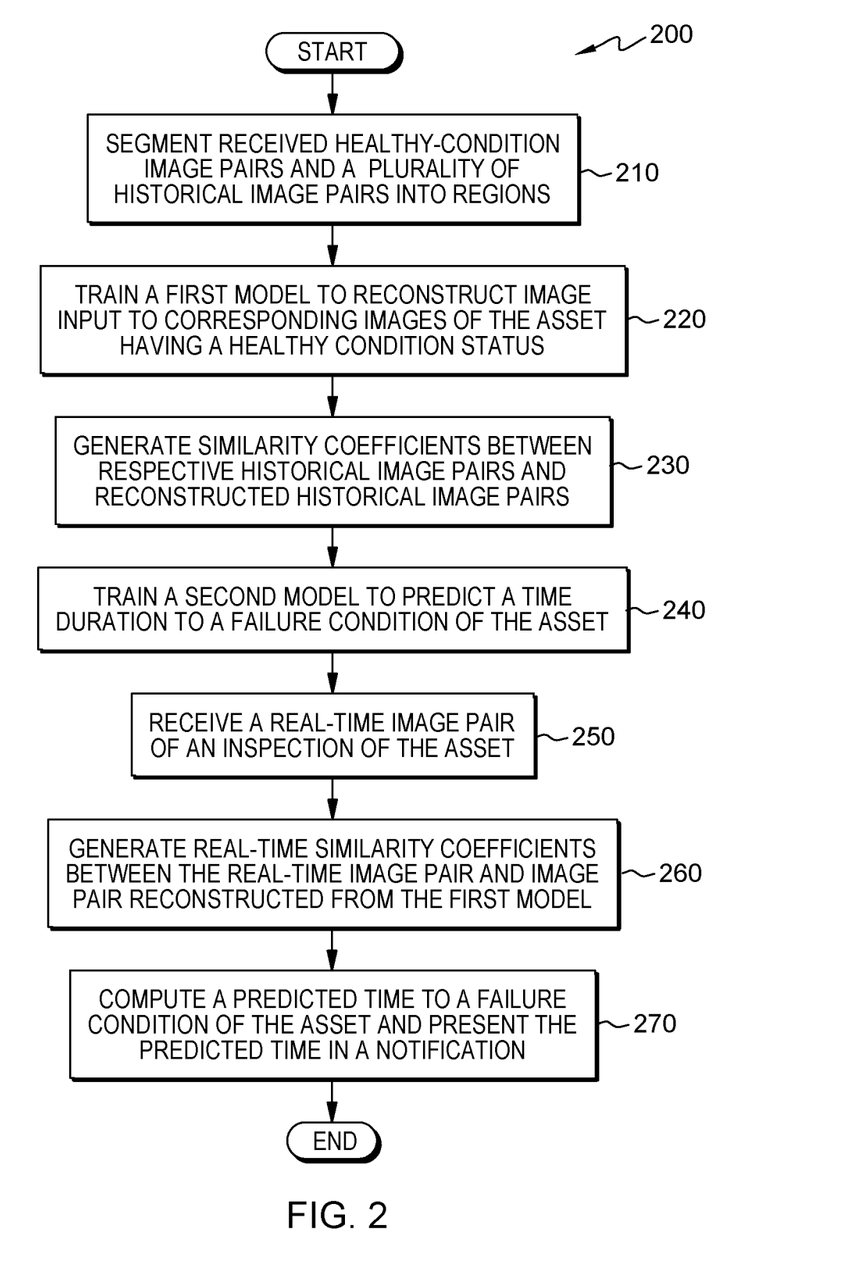
FIG. 2 is a flowchart depicting the operational steps of a failure prediction program, that includes an image rebuild module and an image similarity module as components, operating in the distributed computer processing environment of FIG. 1, in accordance with embodiments of the present invention.

FIG. 2 is a flowchart depicting the operational steps of failure prediction program 200 that includes image rebuild module 117 and an image similarity module 119 as components, operating in the distributed computer processing environment of FIG. 1, in accordance with embodiments of the present invention. Failure prediction program 200 receives a selection of healthy condition status image pairs of the asset. The healthy condition image pairs include a regular image and an infrared image of the asset.

Failure prediction program 200 segments the received healthy condition image pairs and a plurality of historical image pairs into regions (step 210). The healthy condition image pairs that are received reflect a near-new type of asset condition. The capture of the plurality of historical image pairs associated with historical interventions that include inspections performed between instances of a failure condition of the asset and images taken during an intervention to repair or replace the asset occurs at approximately the same time. The image pairs contain a regular visible light image and an infrared image of the asset. The historical image pairs of the asset include a timestamp of the image capture and information associated with the particular intervention activity.

Failure prediction program 200 segments the image pairs into a square matrix of regions designated by an "n×n" format, in which "n" is a positive non-zero integer. Segmentation of the images enables a more granular representation of the asset and asset components. Each region of an image includes a quantity of pixels, and serves as the basis to compute similarity coefficients by performing a similarity function between a region of an image and the corresponding region of the first model's reconstructed version of the image (i.e., a healthy condition asset image).

Failure prediction program 200 includes training of a first model to reconstruct the image input to resemble images of the asset having a healthy condition status (step 220). Failure prediction program 200 includes image rebuild module 117, which receives an input of an image of the asset and reconstructs the image to resemble a healthy condition image of the asset, based on training that includes receipt of a selection of healthy condition images of the asset.

As such, the training of image rebuild module 117 includes only using images that depict a healthy condition status of the asset as training data. In some embodiments, the reconstruction function of image rebuild module 117 of failure prediction program 200 creates a reference base of the asset in a healthy condition, which provides a reference point for determining the similarity coefficients of historical image pairs and real-time images from inspections of the asset. Use of a reconstruction of an image of a particular image pair of the asset instead of constantly reusing one instance of a healthy condition asset image improves the consistency and precision of similarity coefficients and prevents additional pixel noise due to differences in lighting, angles, and other conditions that exist when images are captured.

Failure prediction program 200 generates similarity coefficients between respective historical image pairs and the corresponding reconstructed historical image pairs (step 230). Failure prediction program 200 applies a similarity function to the segmented regions of each image of the image pair of the plurality of historical image pairs. The similarity function determines a similarity metric between the segmented regions of each image of a respective historical image pair and the segmented regions of each image of the historical image pair submitted to the first model to reconstruct the image to resemble, as near as the trained model performs, an image of the asset having a healthy condition status. In some embodiments, determining a Euclidian distance between corresponding regions of the images provides a similarity coefficient metric. In other embodiments, other similarity functions, such as a cosine similarity function, provide the similarity coefficient metric. Embodiments of the present invention are not limited by the type or manner of similarity functions applied in determining a similarity coefficient between regions of images. In embodiments of the present invention, failure prediction program 200 provides similarity coefficients for infrared images and regular images through image similarity module 119.

Failure prediction program 200 trains a second model to predict a time duration to a failure condition of the asset (step 240). Failure prediction program 200 utilizes the timestamp and other information associated with the respective image pairs of the asset's historical interventions. Similarity coefficients of the plurality of historical image pairs and the timestamp and intervention information associated with respective historical image pair provide the training basis for the second model to correlate the similarity coefficients and duration between the historical image pair capture timestamp and the timestamp of the next subsequent failure condition of the asset. By training the second model on the entire plurality of historical image pairs, which include failure conditions of the asset and inspections of the asset between failures, the second model forms correlations between conditions represented by the similarity coefficients of the infrared and regular images and the anticipated time to a failure condition of the asset.

In some embodiments, the additional information associated with the historical interventions of the asset, such as recorded in connection with a work order for the intervention, provide predictions of the duration and cost associated with an intervention performed prior to the predicted failure condition of the asset.

Failure prediction program 200 receives a real-time image pair of an inspection of the asset and segments the received real-time image pair (step 250). In various embodiments, the asset owners schedule an inspection of the asset during the asset's operation. The inspection includes capture of an infrared image and a regular image of the asset, forming a real-time image pair associated with the inspection, including a timestamp of the image pair capture. Failure prediction program 200 receives the real-time image pair and proceeds to process the image pair to enable a prediction of a time to failure condition of the asset from the point of image pair capture from the real-time inspection of the asset. Failure prediction program 200 segments the image pairs into regions.

Failure prediction program 200 generates real-time similarity coefficients between the real-time image pair and the reconstruction of the image pair from the first model (step 260). Failure prediction program 200 applies a similarity function to the images of the real-time image pair to generate similarity coefficients for the segmented regions. Failure prediction program 200 submits an infrared image and a regular image as a digitized file to the first model, image rebuild module 117, to reconstruct the infrared image and regular image from the real-time inspection to images corresponding to a healthy condition status of the asset. Failure prediction program 200 generates similarity coefficients between the reconstructed image regions resembling the asset with a healthy condition status and the regions of the real-time infrared image and regular image of the inspection image pair.

Failure prediction program 200 determines a predicted time to a failure condition of the asset and presents the predicted time in a notification (step 270). Failure prediction program 200 provides the generated similarity coefficients to the trained second model that correlates the similarity coefficients and the timestamp of the regions of the real-time image pair with the historical image pair region similarity coefficients and timestamps used to train the second model. Failure prediction program 200 determines a prediction of the duration from the time of capture of the real-time inspection image pair until the anticipated failure condition of the asset. In some embodiments of the present invention, failure prediction program 200 includes the prediction time to failure condition of the asset in a notification that is presented (e.g., to a display). In some embodiment, failure prediction program 200 presents the notification to one or more designated recipients by a predetermined mode of delivery, such as an SMS message, an email, a pop-up display on a monitor associated with the asset, or other notification delivery medium.

Having determined the predicted time to a failure condition of the asset and presented the predicted time in a notification, failure prediction program 200 ends. To further clarify aspects of the current invention, use cases describing embodiments of the present invention are provided.

In one embodiment, an inspection is performed on an autonomous elevator and produces a pair of images that includes a visible light image and an infrared image. Embodiments of the present invention eliminate a repetitive need for repetitive human inspections and thus refrain from excessive out-of-service time. Reduced human inspections within elevator shafts also reduce human risk and accidents related to in-person inspections as images can be performed from mounted camera systems or camera capture of asset images from safe or remote locations. Prediction of the time to a failure condition of the asset reduces or eliminates inspections and maximizes operational time by precise scheduling of maintenance interventions.

Embodiments of the present invention provide direct benefit to an autonomous escalator and moving walkway inspections. Installation of image capturing sensors/cameras internal to the assets enable accurate prediction of time to a failure condition of the assets and provide for efficient scheduling of maintenance intervention activities. Results save operational time, cost, and promoting safer conditions for human interactions.

Trains, subways, buses, and trucks can take advantage of scheduled stops as an opportunity for capturing images of critical asset components and enable precisely schedule maintenance activity prior to predicted failure conditions. The scheduled maintenance is based on evidence-based data and machine learning rather than on regular intervals or distance traveled, which provides greater efficiency in-vehicle operation while preventing the occurrence of failure conditions of the asset and/or asset components.

Figure 3:
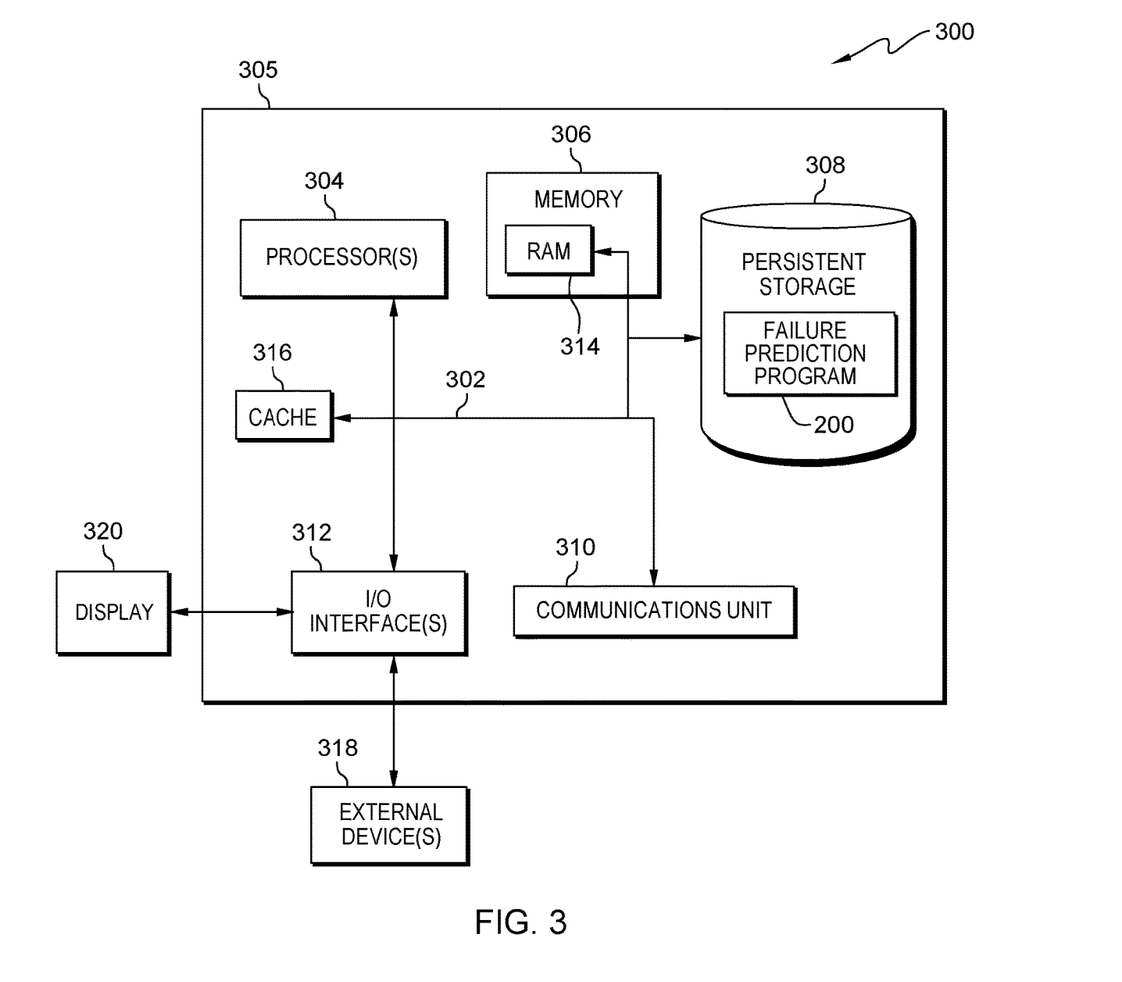
FIG. 3 depicts a block diagram of components of a computing system, including a computing device configured to operationally perform the failure prediction program that includes the image rebuild module and the image similarity module of FIG. 2, in accordance with an embodiment of the present invention.

FIG. 3 depicts a block diagram of components of a computing system, including a computing device configured to operationally perform the failure prediction program that includes the image rebuild module and the image similarity module of FIG. 2, in accordance with an embodiment of the present invention.

Computing device 305 includes components and functional capability similar to components of computing device 110 (FIG. 1), in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computing device 305 includes communications fabric 302, which provides communications between computer processor(s) 304, memory 306, persistent storage 308, communications unit 310, an input/output (I/O) interface(s) 312. Communications fabric 302 can be implemented with any architecture designed for passing data and/or control information between processors (such as microprocessors, communications, and network processors, etc.), system memory, peripheral devices, and any other hardware components within a system. For example, communications fabric 302 can be implemented with one or more buses.

Memory 306, cache memory 316, and persistent storage 308 are computer-readable storage media. In this embodiment, memory 306 includes random access memory (RAM) 314. In general, memory 306 can include any suitable volatile or non-volatile computer-readable storage media.

In one embodiment, failure prediction program 200 is stored in persistent storage 308 for execution by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid-state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 310, in these examples, provides for communications with other data processing systems or devices, including resources of distributed computer processing environment 100. In these examples, communications unit 310 includes one or more network interface cards. Communications unit 310 may provide communications through the use of either or both physical and wireless communications links. Failure prediction program 200 may be downloaded to persistent storage 308 through communications unit 310.

I/O interface(s) 312 allows for input and output of data with other devices that may be connected to computing system 300. For example, I/O interface 312 may provide a connection to external devices 318 such as a keyboard, keypad, a touch screen, and/or some other suitable input device. External devices 318 can also include portable computer-readable storage media such as, for example, thumb drives, portable optical or magnetic disks, and memory cards. Software and data used to practice embodiments of the present invention, e.g., failure prediction program 200 can be stored on such portable computer-readable storage media and can be loaded onto persistent storage 308 via I/O interface(s) 312. I/O interface(s) 312 also connects to a display 320.

Display 320 provides a mechanism to display data to a user and may, for example, be a computer monitor.

The foregoing description is an example of embodiments of the invention, and variations and substitutions can be made in implementations without detracting from the novel aspects of the embodiments.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for predicting a time to a failure condition of an asset, the computer-implemented method comprising:
    training, by one or more processors, a first model to reconstruct an image pair of an asset to a healthy condition status image pair of the asset;
    generating, by the one or more processors, a similarity coefficient between respective historical image pairs of a plurality of historical image pairs of the asset and a reconstruction of respective historical image pairs by the first model, wherein the respective historical image pairs includes a timestamp of a capture of the respective historical image pairs;
    training, by the one or more processors, a second model to predict a duration until a failure condition of the asset occurs, based on a correlation between the similarity coefficients and the timestamps of the capture of the respective historical image pairs and a real-time image pair of the asset and a corresponding timestamp of the capture of the real-time image pair;
    in response to receiving a first real-time image pair of the asset and a timestamp of the capture of the first real-time image pair, generating, by the one or more processors, similarity coefficients between the first real-time image pair and a reconstructed real-time image pair by the first model; and computing, by the one or more processors, a predicted time to a failure condition status of the asset, based on the similarity coefficients and the timestamp of the capture of the first real-time image pair, a historical image pair and timestamp with corresponding similarity coefficients, and a timestamp of the failure condition of the asset.

2. The computer-implemented method of claim 1, wherein reconstruction of a respective historical image pair of the asset is performed by the first model and trained by at least one of the healthy condition status image pair of the asset.

3. The computer-implemented method of claim 1, wherein the respective historical image pairs and the first real-time image pair include a visible light image and an infrared light image, which are segmented into pixel regions of features of the asset and similarity coefficients are calculated for respective segmented regions.

4. The computer-implemented method of claim 1, wherein the similarity coefficient is a magnitude value given to a vector in multi-dimensional space representing the distances between one or more features located within respective regions of a pair of images.

5. The computer-implemented method of claim 1, wherein the training of the first model includes providing at least one of the healthy condition status image pair of the asset from a sampling of the respective historical image pairs of the asset as training data input, establishing a reconstruction reference of the healthy condition status image pairs of the asset, and the respective historical image pairs of various stages of operation ranging from a healthy condition status image pairs to failure condition status image pairs of the asset.

6. The computer-implemented method of claim 3, wherein separately developed and trained versions of the first model perform reconstruction of the infrared image of an image pair and the visible light image of the image pair, to a corresponding healthy condition status image pair of the asset.

7. The computer-implemented method of claim 3, wherein training of the second model includes separate versions using regular visible-light image pair similarity coefficients and infrared image pair similarity coefficients, respectively, from real-time inspections of the asset.

8. The computer-implemented method of claim 1, wherein the first model is a set of autoencoding convolutional neural networks that receives infrared images and regular visible-light images of the asset as input.

9. The computer-implemented method of claim 1, wherein the respective historical image pairs and the first real-time image pair are segmented into regions and the regions are further segmented into a square matrix of sub-regions.

10. The computer-implemented method of claim 1, wherein the similarity coefficients include a multi-dimensional vector of a Euclidian distance between segmented regions of respective images of the image pair.

11. A computer program product for predicting a time to a failure condition of an asset, the computer program product comprising:
one or more computer readable storage media, and program instructions collectively stored on the one or more computer readable storage media, the program instructions comprising:
program instructions to train a first model to reconstruct respective images of an image pair of the asset to a healthy condition status of the asset;
program instructions to generate a similarity coefficient between respective historical image pairs of a plurality of historical image pairs of the asset and a reconstruction of the respective historical image pairs to the healthy condition status, by the first model, wherein the respective historical image pairs include a timestamp of a capture of the respective historical image pairs;
program instructions to train a second model trained to predict a duration until a failure condition of the asset occurs, based on the similarity coefficients and the timestamps of the capture of the respective historical image pairs and a real-time image pair of the asset and a corresponding timestamp of the capture of the real-time image pair;
in response to receiving a first real-time image pair of the asset and a timestamp of the capture of the first real-time image pair, program instructions to generate similarity coefficients between the first real-time image pair of the asset and a reconstructed real-time image pair of the asset, by the first model; and
program instructions to compute a predicted time to a failure condition status of the asset, based on the similarity coefficients and the timestamp of the capture of the first real-time image pair, a historical image pair and timestamp with corresponding similarity coefficients, and a timestamp of the failure condition of the asset.

12. The computer program product of claim 11, wherein the respective historical image pairs and the first real-time image pair include a visible light image and an infrared image, which are segmented into pixel regions of features of the asset and similarity coefficients are calculated for respective segmented regions.

13. The computer program product of claim 11, wherein the similarity coefficient is a magnitude value given to a vector in multi-dimensional space representing the distances between one or more features located within respective regions of the pair of images.

14. The computer program product of claim 11, wherein the training of the first model includes providing at least one of the healthy condition status image pair of the asset from a sampling of the respective historical image pairs of the asset as training data input, establishing a reconstruction reference of the healthy condition status image pairs of the asset, and the respective historical image pairs of various stages of operation of the asset including the failure condition.

15. The computer program product of claim 12, wherein separately developed and trained versions of the first model perform reconstruction of the infrared image of the first real-time image pair and the visible light image of the first real-time image pair, to a corresponding healthy condition status image pair of the asset.

16. A computer system for predicting a time to a failure condition of an asset, the computer system comprising:
one or more computer processors;
one or more computer readable storage media, and program instructions collectively stored on the one or more computer readable storage media, the program instructions comprising:
program instructions to train a first model to reconstruct respective images of an image pair of the asset to a healthy condition status of the asset;
program instructions to generate a similarity coefficient between respective historical image pairs of a plurality of historical image pairs of the asset and a reconstruction of the respective historical image pairs to the healthy condition status, by the first model, wherein the respective historical image pairs include a timestamp of a capture of the respective historical image pairs;

program instructions to train a second model to predict a duration until a failure condition of the asset occurs, based on the similarity coefficients and the timestamps of the capture of the respective historical image pairs and a real-time image pair of the asset and a corresponding timestamp of the capture of the real-time image pair;

in response to receiving a first real-time image pair of the asset and a timestamp of the capture of the first real-time image pair, program instructions to generate similarity coefficients between the first real-time image pair of the asset and a reconstructed real-time image pair of the asset, by the first model; and program instructions to compute a predicted time to a failure condition status of the asset, based on the similarity coefficients and the timestamp of the capture of the first real-time image pair, a historical image pair and timestamp with corresponding similarity coefficients, and a timestamp of the failure condition of the asset.

17. The computer system of claim 16, wherein training of the second model includes separate versions using regular visible-light image pair similarity coefficients and infrared image pair similarity coefficients, respectively, from real-time inspections of the asset.

18. The computer system of claim 16, wherein the first model is a set of autoencoding convolutional neural networks that receives infrared images and regular visible-light images of the asset as input.

19. The computer system of claim 16, wherein the respective historical image pairs and first real-time image pair are segmented into regions and the regions are further segmented into a square matrix of sub-regions.

20. The computer system of claim 16, wherein the similarity coefficients include a multi-dimensional vector of a Euclidian distance between segmented regions of respective images of the image pair.

* * * * *